United States Patent
Zheng

(10) Patent No.: US 11,166,590 B2
(45) Date of Patent: Nov. 9, 2021

(54) GRILL FOR GRANULAR FUEL

(71) Applicant: Ningbo Huige Outdoor Products Co., Ltd., Zhejiang (CN)

(72) Inventor: Songcun Zheng, Zhejiang (CN)

(73) Assignee: Ningbo Huige Outdoor Products Co., Ltd., Zhejiang (CN)

(*) Notice: Subject to any disclaimer, the term of this patent is extended or adjusted under 35 U.S.C. 154(b) by 296 days.

(21) Appl. No.: 16/166,072

(22) Filed: Oct. 20, 2018

(65) Prior Publication Data

US 2019/0387924 A1 Dec. 26, 2019

(30) Foreign Application Priority Data

Jun. 21, 2018 (CN) .......................... 201820962394.2

(51) Int. Cl.
  *A47J 37/07* (2006.01)
(52) U.S. Cl.
  CPC .................. *A47J 37/0713* (2013.01)
(58) Field of Classification Search
  CPC .................................................. A47J 37/0713
  USPC ............................................................ 126/1 R
  See application file for complete search history.

(56) References Cited

U.S. PATENT DOCUMENTS

| | | | | |
|---|---|---|---|---|
| 4,569,327 A * | 2/1986 | Velten | ............... | A47J 37/0763 126/25 A |
| 4,823,684 A * | 4/1989 | Traeger | ............... | A47J 37/0704 126/10 |
| 4,945,893 A * | 8/1990 | Manchester | ........ | A47J 37/1223 126/391.1 |
| 5,910,209 A * | 6/1999 | Lee | .......................... | A47J 36/38 126/25 R |
| 6,223,737 B1 * | 5/2001 | Buckner | ................... | F23B 1/38 110/108 |
| 8,662,070 B2 * | 3/2014 | Johnston | .............. | A47J 37/0713 126/25 A |
| 2006/0124120 A1 * | 6/2006 | Gross | .................... | A47J 37/079 126/25 B |
| 2012/0216788 A1 * | 8/2012 | Benedetti | ................ | F24B 1/188 126/58 |
| 2012/0247448 A1 * | 10/2012 | Thibodeaux | ............ | A47J 37/07 126/25 R |
| 2013/0206132 A1 * | 8/2013 | Simms, II | ........... | A47J 37/0763 126/25 R |
| 2014/0224750 A1 * | 8/2014 | Vogds | ................. | A47J 37/0664 211/13.1 |
| 2016/0327263 A1 * | 11/2016 | Traeger | ..................... | F24C 1/04 |

* cited by examiner

*Primary Examiner* — Kenneth J Hansen
*Assistant Examiner* — John E Bargero
(74) *Attorney, Agent, or Firm* — JCIPRNET

(57) ABSTRACT

A granule burning grill includes a body, a burning chamber, and a grill grate. The burning chamber and the grill grate are disposed inside the body. The grill grate is provided above the burning chamber. A side portion of the body is provided with a feeding opening for the granular fuel. A heat collecting mechanism located in the body is provided between the grill grate and the burning chamber. A ceramic plate module is provided between the heat collecting mechanism and the grill grate.

10 Claims, 4 Drawing Sheets

GRILL FOR GRANULAR FUEL

CROSS-REFERENCE TO RELATED APPLICATION

This application claims the priority benefit of China application serial no. 201820962394.2, filed on Jun. 21, 2018. The entirety of the above-mentioned patent application is hereby incorporated by reference herein and made a part of this specification.

TECHNICAL FIELD

The invention relates to a grill, and more particularly, to a grill for granular fuel.

DESCRIPTION OF RELATED ART

A grill is a cooking device which can be used to make barbecue foods, such as kebabs and roast meat. A grill adapted for granular fuel is a kind of grill performs heating and burning by granular fuel. A conventional grill for granular fuel generally includes a body provided with a burning chamber thereinside, wherein a grill grate is provided above the burning chamber. A side of the body is provided with a feeding opening. Granular fuel is transported to the burning chamber and burns in the burning chamber to generate heat, thus grilling the food placed on the grill. In a structure of the conventional grill, due to a relatively large internal space of the body, the heat generated by the granular fuel is unevenly distributed in the body. Even if fuel materials are increased, it is difficult to effectively increase temperature of the grill, thus causing a relatively long time for the food to be fully cooked and a lower grilling efficiency, as a result, such type of grills are often used as smoker grill.

SUMMARY OF THE INVENTION

The technical problem to be solved by the invention is to provide a grill for granular fuel which has advantages of a simple structure and a high grilling efficiency, and can be used as a smoker grill at a low temperature in slow heating speed, as well as a grill at a high temperature in quick heating speed.

The technical solution adopted in the present invention to solve the above technical problems is as follows.

A granule burning grill includes a body provided with a burning chamber and a grill grate thereinside. The grill grate is provided above the burning chamber. A side portion of the body is provided with a feeding opening for the granular fuel. A heat collecting mechanism located in the body is provided between the grill grate and the burning chamber. A ceramic plate module is provided between the heat collecting mechanism and the grill grate.

The heat collecting mechanism comprises a collecting tube vertically provided on a bottom plate of the body. The burning chamber is provided in the collecting tube. The collecting tube is provided with a diffusing tube. A lower portion of the diffusing tube is sealedly connected with the collecting tube. An upper portion of the diffusing tube is connected with a sidewall of the body. A diffusing chamber is provided in the diffusing tube and has an upper end and a lower end that has a size smaller than that of the upper end. The ceramic plate module is provided above the diffusing tube. A side of the collecting tube is provided with a discharging opening at a position opposite to the feeding opening. A feeder is provided between the discharging opening and the feeding opening for transportation of the granular fuel. One end of the feeder extends into the burning chamber through the discharging opening. The heat collecting mechanism has a simple structure, wherein heat generated by the granular fuel in the burning chamber is gathered by the collecting tube, and then the heat is transmitted to the ceramic plate module via the diffusing tube, and uniformly transmitted to the grill grate through the ceramic plate module. The granular fuel materials are transported to the burning chamber through the feeder.

The collecting tube is a square tube surrounded by a front vertical plate, a rear vertical plate, a left vertical plate, and a right vertical plate. The front vertical plate and the rear vertical plate are distantly provided front and rear side-by-side. Two sides of the front vertical plate and two sides of the rear vertical plate are respectively connected by the left vertical plate and the right vertical plate. The diffusing tube is surrounded by a front inclined plate, a rear inclined plate, a left inclined plate, and a right inclined plate. The front inclined plate is inclined downward from front to rear, and has a lower end connected with an upper end of the front vertical plate. The rear inclined plate is inclined downward from rear to front, with a lower end of the rear inclined plate connected with an upper end of the rear vertical plate. The left inclined plate is inclined downward from left to right, with a lower end of the left inclined plate connected with an upper end of the left vertical plate. The right inclined plate is inclined downward from the right to the left, with a lower end of the right inclined plate connected with an upper end of the right vertical plate. The upper ends of the left inclined plate and the right inclined plate are connected with and mounted to an internal wall of the body. The diffusing tube is composed of four inclined plates, which form the diffusing chamber that is larger at top and smaller at bottom, so that the heat can be efficiently expanded to the grill grate to improve the grilling efficiency. In addition, the inclined plates can reflect the heat received by themselves to the grill grate, so as to make the grilling more efficient.

The ceramic plate module comprises a mounting frame. A ceramic plate is horizontally mounted on the mounting frame. Two sides of the mounting frame are respectively provided with a lifting handle. The above ceramic plate module has a simple structure. The mounting frame is used for mounting the ceramic plate, and the lifting handle facilitates picking-up and placement of the ceramic plate module.

The ceramic plate is provided with a plurality of through holes. The front inclined plate is provided with an oil-discharging opening which is sealedly connected with an oil-discharging tube. The body is drawably provided with an oil-receiving pan which is provided below the oil-discharging tube. The waste oil dripping from the grill grate can drop through the through holes of the ceramic plate, and the waste oil is received by the inclined plate of the diffusing tube, and then discharged to the oil-receiving pan through the oil-discharging tube, wherein the oil-receiving pan can be drawably provided for the cleaning of waste oil.

Left and right internal sidewalls of the body are respectively provided with a horizontal left mounting plate and a right mounting plate. An upper end of the left inclined plate is bent outward to form a horizontal left mounting portion which is mounted on the left mounting plate. The upper end of the right inclined plate is bent outward to form a horizontal right mounting portion which is mounted on the right mounting plate. The ceramic plate module is placed on the left and right mounting portions. The arrangement of the left mounting plate and the right mounting plate facilitates the installation and positioning of the diffusing tube, and provides a stable mounting orientation for the mounting of the ceramic plate module.

An external side portion of the body is provided with a feeding box which is located at the same side as the feeding opening, and another end of the feeder extends into and is disposed inside the feeding box. The granular material is fed into the feeder through the feeding box.

The front inclined plate, the rear inclined plate, the left inclined plate, and the right inclined plate are all heat-radiating plates. The inclined plates are all heat-radiating plates with a better heat-reflecting effect, which can more effectively improve the grilling efficiency. The heat-radiating plate can be made of materials, such as a stainless steel mirror plate, a galvanized plate or an aluminized plate, which have a good reflecting performance and a high-temperature resistance with no toxicity and harm.

A distance between the ceramic plate module and the grill grate is 40±5 millimeters. The ceramic plate module and the grill grate are kept at a certain distance to ensure the cleanliness of the food in the barbecue. The distance of 40±5 millimeters can avoid clean food from colliding with the grease residue falling on the ceramic plate and can ensure a good and relatively balanced temperature of the grill grate.

A fire shield is provided above the collecting tube, and is provided in the diffusing tube.

Comparing with the prior art, the invention has the advantages as follows. A heat collecting mechanism located in the body is provided between the grill grate and the burning chamber. The heat collecting mechanism has a simple structure, wherein the heat generated by the burning chamber is gathered together by the heat collecting mechanism and then diffused to the ceramic plate module provided on the heat collecting mechanism, and uniformly transmitted to the grill grate received by the ceramic plate module, which can more effectively improve the grilling efficiency. The temperature of the grill can be adjusted through the adjustment of the amount of the burning granules and the firepower of the burning chamber, so that the barbecue can be fumed both at a low temperature and at a low speed, or be quickly grilled at a high temperature. Meanwhile, the temperature transmitted to the grill grate through the ceramic plate is relatively balanced whether the barbecue is smoked or grilled.

DETAILED DESCRIPTION OF THE PREFERRED EMBODIMENTS

The present invention is further detailed in combination with the drawings and embodiments as follows.

Figure 1:
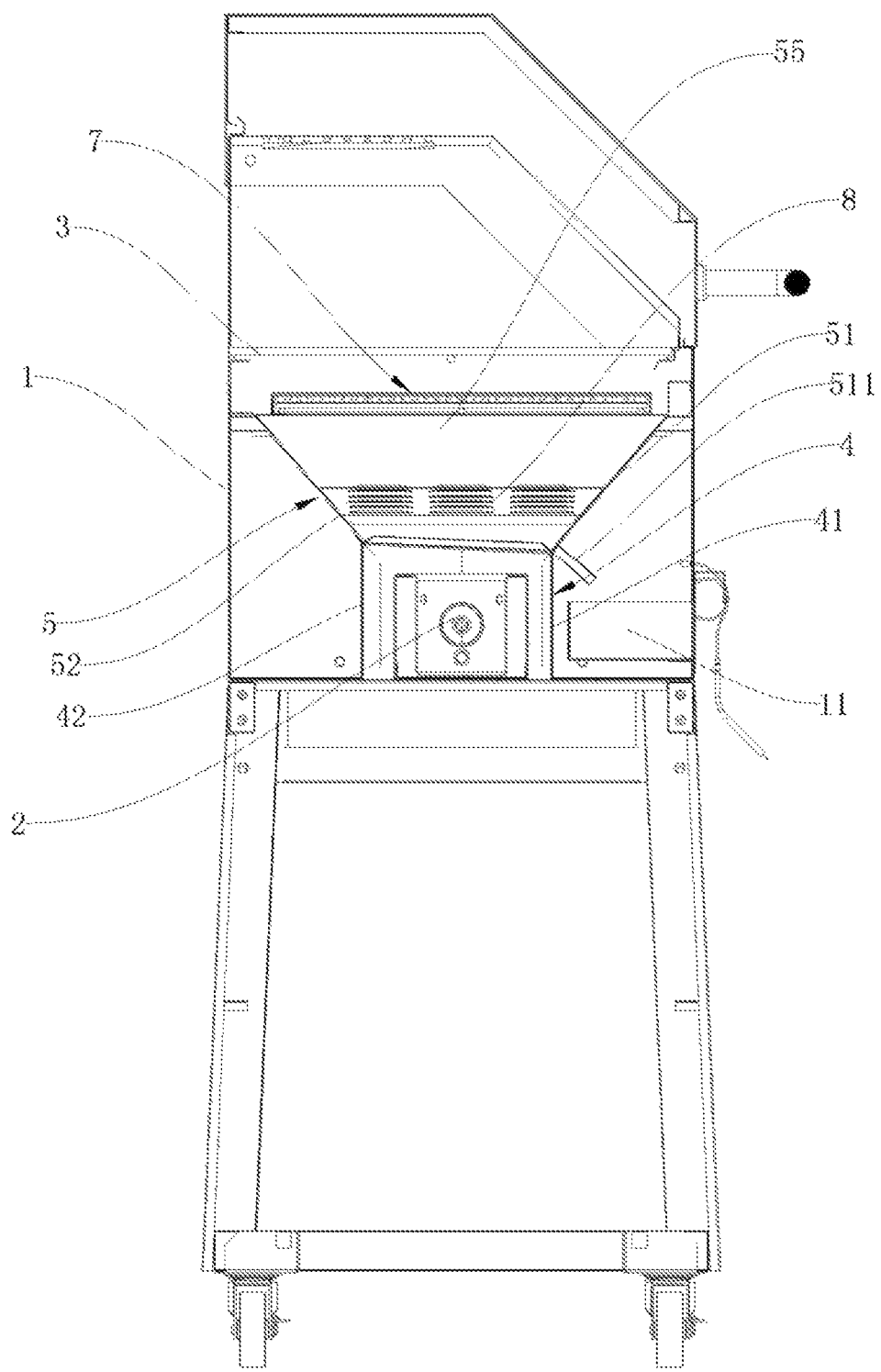
FIG. 1 is a first cross-sectional structural view of the present invention.
Figure 2:
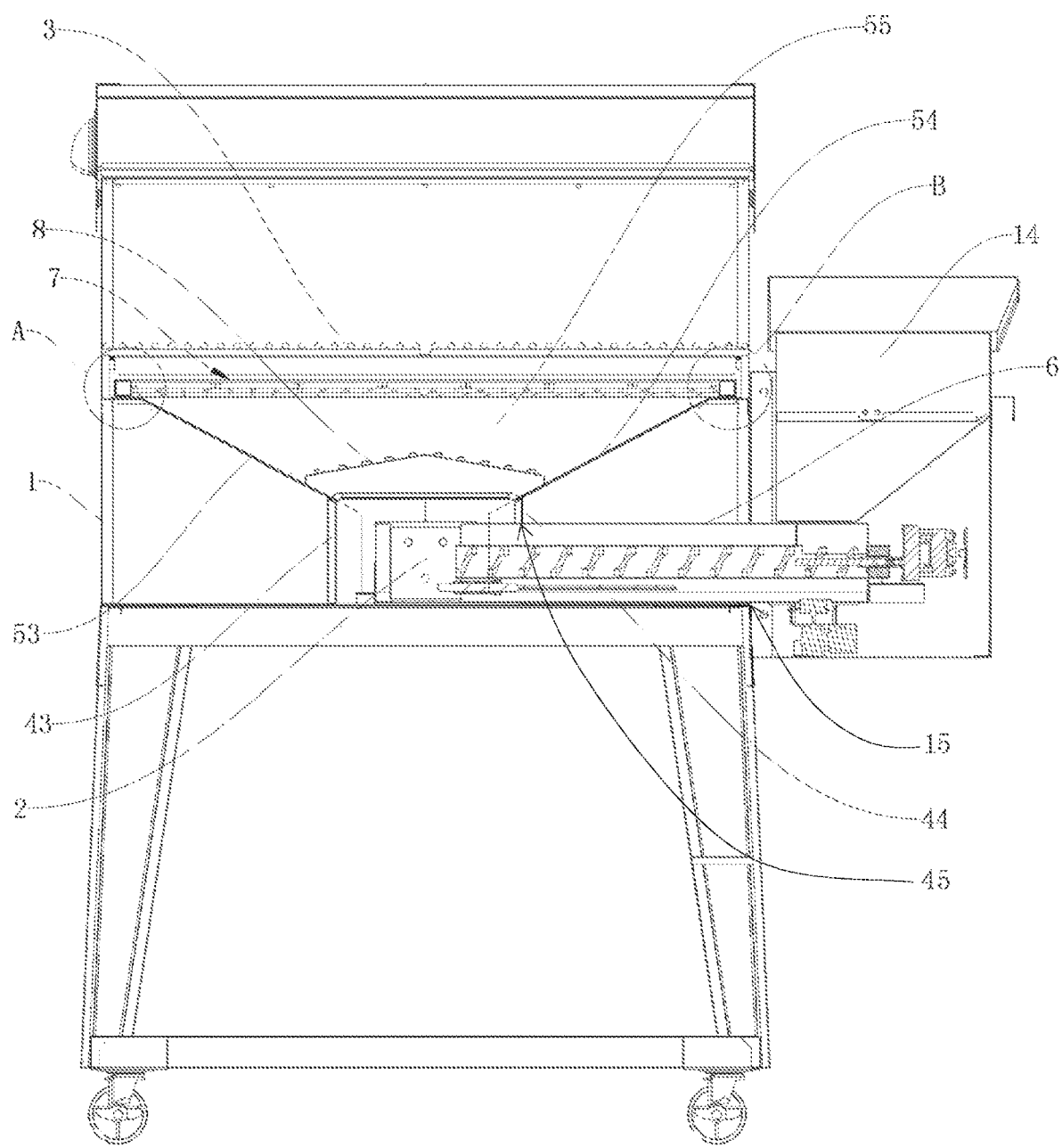
FIG. 2 is a second cross-sectional structural view of the present invention.
Figure 3:
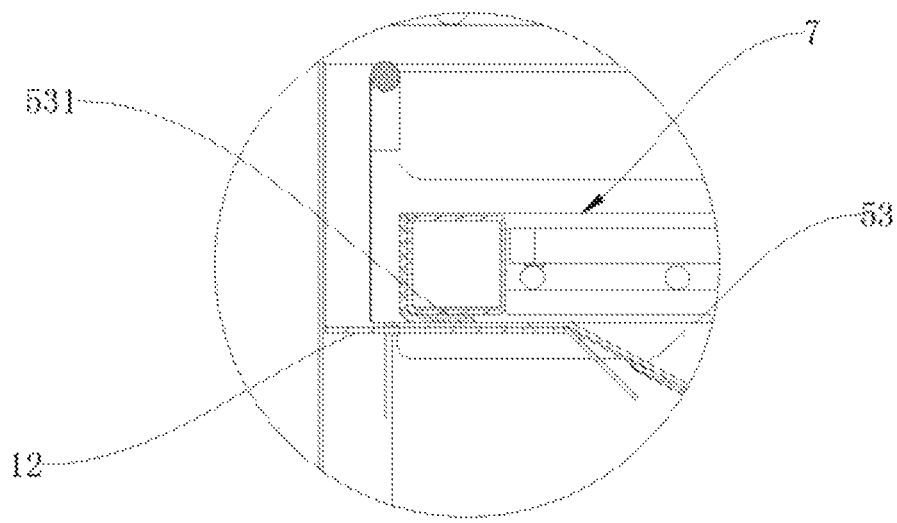
FIG. 3 is an enlarged structural view of Position (A) in FIG. 2.
Figure 4:
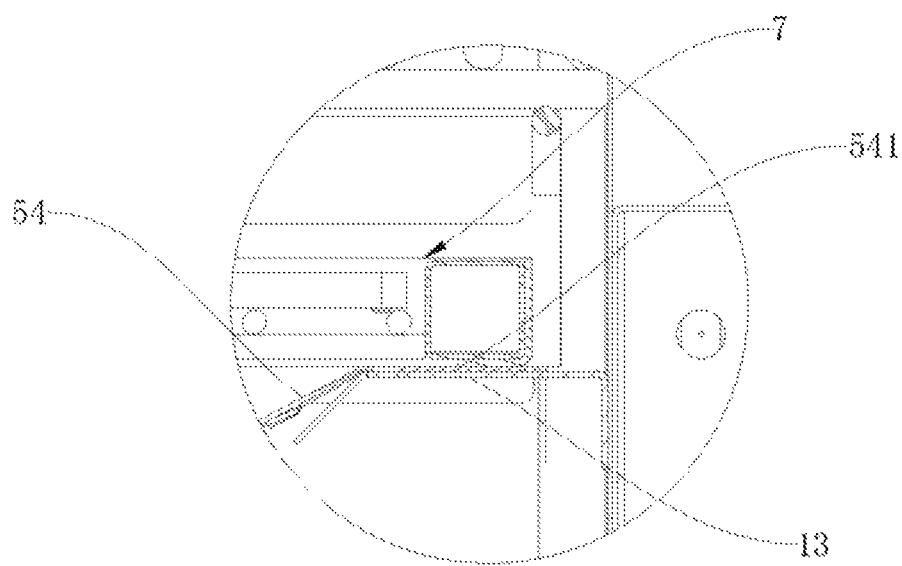
FIG. 4 is an enlarged structural view of Position (B) in FIG. 2.
Figure 5:
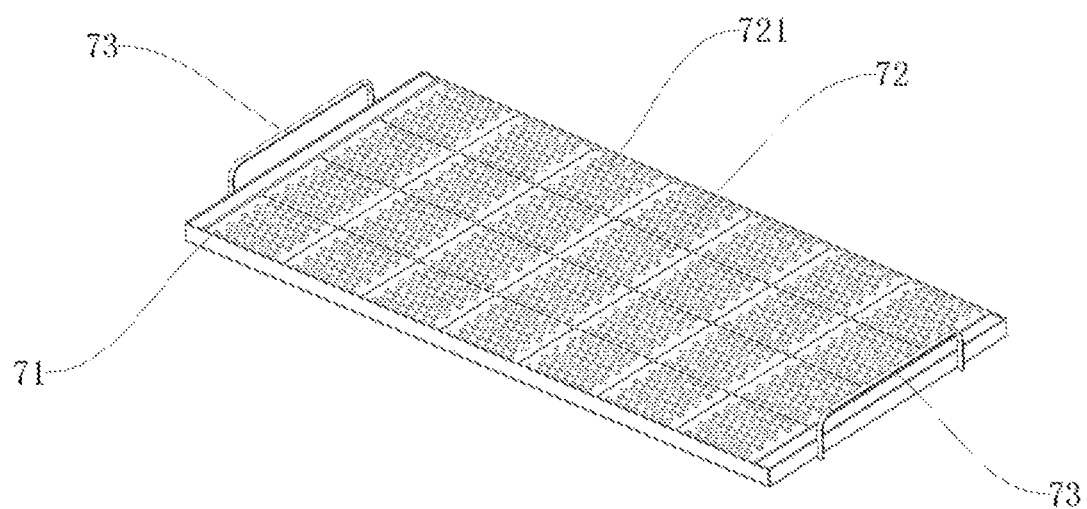
FIG. 5 is a structural view of the ceramic plate module in the present invention.

As shown in FIG. 1 to FIG. 5, a grill for granular fuel includes a body 1 provided with a burning chamber 2 and a grill grate 3 thereinside. The grill grate 3 is provided above the burning chamber 2. A side portion of the body 1 is provided with a feeding opening 15 for the granular fuel (not shown). A heat collecting mechanism located in the body 1 is provided between the grill grate 3 and the burning chamber 2. A ceramic plate module 7 is provided between the heat collecting mechanism and the grill grate 3.

In the embodiment, the heat collecting mechanism includes a collecting tube 4 vertically provided on a bottom plate of the body 1. The burning chamber 2 is provided in the collecting tube 4 which is provided with a diffusing tube 5. A lower portion of the diffusing tube 5 is sealedly connected with the collecting tube 4. An upper portion of the diffusing tube 5 is connected with the sidewall of the body 1. A diffusing chamber 55 is provided in the diffusing tube 5, and has an upper end and a lower end that has a size smaller than that of the upper end. The ceramic plate module 7 is provided above the diffusing tube 5. A side of the collecting tube 4 is provided with a discharging opening 45 at a position opposite to the feeding opening 15. A feeder 6 is provided between the discharging opening 45 and the feeding opening 15 for transportation of the granular fuel. One end of the feeder 6 extends into the burning chamber 2 through the discharging opening 45. The heat collecting mechanism has a simple structure, wherein the heat generated by the burning of the burning chamber 2 is gathered by the collecting tube 4, and then the heat collected by the diffusing tube 5 is transmitted to the ceramic plate module 7 and uniformly transmitted to the grill grate 3 through the ceramic plate module 7. The granular burning materials (i.e., the granular fuel) are transported to the burning chamber 2 through the feeder 6.

In the embodiment, the collecting tube 4 is a square tube surrounded by a front vertical plate 41, a rear vertical plate 42, a left vertical plate 43, and a right vertical plate 44. The front vertical plate 41 and the rear vertical plate 42 are distantly provided front and rear side-by-side. Two sides of the front vertical plate 41 and the rear vertical plate 42 are respectively connected by the left vertical plate 43 and the right vertical plate 44. The diffusing tube 5 is surrounded by a front inclined plate 51, a rear inclined plate 52, a left inclined plate 53, and a right inclined plate 54. The front inclined plate 51 is inclined downward from front to rear, with a lower end of the front inclined plate 51 connected with the upper end of the front vertical plate 41. The rear inclined plate 52 is inclined downward from rear to front, with a lower end of the rear inclined plate 52 connected with the upper end of the rear vertical plate 42. The left inclined plate 53 is inclined downward from left to right, with a lower end of the left inclined plate 53 connected with the upper end of the left vertical plate 43. The right inclined plate 54 is inclined downward from right to left, with a lower end of the right inclined plate 54 connected with the upper end of the right vertical plate 44. The upper ends of the left inclined plate 53 and the right inclined plate 54 are connected with and mounted to an internal wall of the body 1. The diffusing tube 5 is composed of four inclined plates, which form a diffusing chamber 55 larger at top than at bottom, so that the heat can be efficiently expanded to the grill grate 3 to improve the grilling efficiency. Meanwhile, the inclined plate which has a simple structure and a plurality of functions has a function of oil receiving. The waste oil dripping from the grill grate 3 can slowly flow down along the internal wall of the inclined plate. The inclined plates can reflect the heat received by themselves to the grill grate, so as to make the barbecue cooking more efficient.

In the embodiment, the ceramic plate module 7 includes a mounting frame 71 on which a ceramic plate 72 is horizontally mounted. Two sides of the mounting frame 71 are respectively provided with a lifting handle 73. The abovesaid ceramic plate module 7 has a simple structure. The mounting frame 71 is used for mounting the ceramic plate 72, and the lifting handle 73 facilitates the picking-up and placement of the ceramic plate module 7.

In the embodiment, the ceramic plate 72 is provided with a plurality of through holes 721. The front inclined plate 51 is provided with an oil-discharging opening (not shown) which is sealedly connected with an oil-discharging tube 511. The body 1 is drawably provided with an oil-receiving pan 11 which is provided below the oil-discharging tube 511. The waste oil dripping from the grill grate 3 can drip through the through holes 721 of the ceramic plate 72. The waste oil is received by the inclined plate of the diffusing tube and then discharged to the oil-receiving pan 11 through the oil-discharging tube 511. The oil-receiving pan 11 can be drawably provided for the cleaning of waste oil.

In the embodiment, the left and right internal sidewalls of the body are respectively provided with a horizontal left mounting plate 12 and a right mounting plate 13. The upper end of the left inclined plate 53 is bent outward to form a horizontal left mounting portion 531 which is mounted on the left mounting plate 12. The upper end of the right inclined plate 54 is bent outward to form a horizontal right mounting portion 541 which is mounted on the right mounting plate 13. The ceramic plate module 7 is placed on the left mounting portion 531 and the right mounting portion 541. The arrangement of the left mounting plate 12 and the right mounting plate 13 facilitates the installation and positioning of the diffusing tube 5, and provides a stable mounting orientation for the mounting of the ceramic plate module 7.

In the embodiment, an external side portion of the body is provided with a feeding box 14 which is located at the same side as the feeding opening 15, and another end of the feeder 6 extends into and is disposed inside the feeding box 14. The granular material is fed into the feeder 6 through the feeding box 14.

In the embodiment, the front inclined plate 51, the rear inclined plate 52, the left inclined plate 53, and the right inclined plate 54 are all heat-radiating plates. The inclined plates are all heat-radiating plates with a better heat-reflecting effect, which can more effectively improve the grilling efficiency. The heat-radiating plate can be made of materials, such as a stainless steel mirror plate, a galvanized plate or an aluminized plate, which have a good reflecting performance and a high-temperature resistance with no toxicity and harm.

In the embodiment, a fire shield 8 is provided above the collecting tube 4, and is provided in the diffusing tube 5.

In the embodiment, a distance between the ceramic plate module 7 and the grill grate 3 is 40±5 millimeters. The ceramic plate module 7 and the grill grate 3 are kept at a certain distance to ensure the cleanliness of the food in the barbecue. The distance of 40±5 millimeters can avoid clean food from colliding with the grease residue falling on the ceramic plate 71 and can ensure a good and relatively balanced temperature of the grill grate 3.

What is claimed is:

1. A grill for granular fuel, the grill comprising a body provided with a burning chamber and a grill grate thereinside, wherein the grill grate is provided above the burning chamber, and a side portion of the body is provided with a feeding opening for the granular fuel, a heat collecting mechanism located in the body is provided between the grill grate and the burning chamber, and a ceramic plate module is provided between the heat collecting mechanism and the grill grate, wherein the heat collecting mechanism comprises a collecting tube vertically provided on a bottom plate of the body, a side of the collecting tube is provided with a discharging opening at a position opposite to the feeding opening, a feeder is provided between the discharging opening and the feeding opening for transportation of the granular fuel, and one end of the feeder extends into the burning chamber through the discharging opening, wherein the ceramic plate module comprises a mounting frame, a ceramic plate is horizontally mounted on the mounting frame, two sides of the mounting frame are respectively provided with a lifting handle, and the ceramic plate is provided with a plurality of through holes, and waste oil dripping from the grill grate drips through the through holes, wherein the burning chamber is provided in the collecting tube, the collecting tube is provided with a diffusing tube, a lower portion of the diffusing tube is sealedly connected with the collecting tube, an upper portion of the diffusing tube is connected with a sidewall of the body, the whole ceramic plate module is disposed above the diffusing tube.

2. The grill for granular fuel as claimed in claim 1, wherein a diffusing chamber is provided in the diffusing tube and has an upper end and a lower end that has a size smaller than that of the upper end.

3. The grill for granular fuel as claimed in claim 2, wherein the collecting tube is a square tube surrounded by a front vertical plate, a rear vertical plate, a left vertical plate, and a right vertical plate, the front vertical plate and the rear vertical plate are distantly provided front and rear side-by-side, two sides of the front vertical plate and two sides of the rear vertical plate are respectively connected by the left vertical plate and the right vertical plate, the diffusing tube is surrounded by a front inclined plate, a rear inclined plate, a left inclined plate, and a right inclined plate, wherein the front inclined plate is inclined downward from front to rear, and has a lower end connected with an upper end of the front vertical plate, the rear inclined plate is inclined downward from rear to front, with a lower end of the rear inclined plate connected with an upper end of the rear vertical plate, the left inclined plate is inclined downward from left to right, with a lower end of the left inclined plate connected with an upper end of the left vertical plate, the right inclined plate is inclined downward from right to left, with a lower end of the right inclined plate connected with an upper end of the right vertical plate, and upper ends of the left inclined plate and the right inclined plate are connected with and mounted to an internal wall of the body.

4. The grill for granular fuel as claimed in claim 3, wherein the front inclined plate is provided with an oil-discharging opening which is sealedly connected with an oil-discharging tube, and the body is drawably provided with an oil-receiving pan which is provided below the oil-discharging tube.

5. The grill for granular fuel as claimed in claim 1, wherein the front inclined plate is provided with an oil-discharging opening which is sealedly connected with an oil-discharging tube, and the body is drawably provided with an oil-receiving pan which is provided below the oil-discharging tube.

6. The grill for granular fuel as claimed in claim 3, wherein left and right internal sidewalls of the body are respectively provided with a horizontal left mounting plate and a right mounting plate, the upper end of the left inclined plate is bent outward to form a horizontal left mounting portion which is mounted on the left mounting plate, the upper end of the right inclined plate is bent outward to form a horizontal right mounting portion which is mounted on the right mounting plate, and the ceramic plate module is placed on the left and right mounting portions.

7. The grill for granular fuel as claimed in claim 2, wherein an external side portion of the body is provided with a feeding box located at the same side as the feeding opening, and another end of the feeder extends into and is disposed inside the feeding box.

8. The grill for granular fuel as claimed in claim 3, wherein the front inclined plate, the rear inclined plate, the left inclined plate, and the right inclined plate are heat-radiating plates.

9. The grill for granular fuel as claimed in claim 1, wherein a distance between the ceramic plate module and the grill grate is 40±5 millimeters.

10. The grill for granular fuel as claimed in claim 2, wherein a fire shield is provided above the collecting tube, and is provided in the diffusing tube.

* * * * *